United States Patent
Gourlay

(10) Patent No.: US 8,596,692 B1
(45) Date of Patent: Dec. 3, 2013

(54) METHOD AND APPARATUS FOR SLEEVE FOR HOSE COUPLING

(71) Applicant: Robert S. Gourlay, Dothan, AL (US)

(72) Inventor: Robert S. Gourlay, Dothan, AL (US)

( * ) Notice: Subject to any disclaimer, the term of this patent is extended or adjusted under 35 U.S.C. 154(b) by 0 days.

(21) Appl. No.: 13/751,306

(22) Filed: Jan. 28, 2013

(51) Int. Cl.
*F16L 17/00* (2006.01)

(52) U.S. Cl.
USPC .......................................... 285/370; 285/365

(58) Field of Classification Search
USPC ............................ 285/365, 95, 110, 370, 397
See application file for complete search history.

(56) References Cited

U.S. PATENT DOCUMENTS

| | | | | |
|---|---|---|---|---|
| 2,792,242 | A | * | 5/1957 | Hamlin ...................... 235/117 A |
| 2,814,508 | A | * | 11/1957 | Seamark .......................... 285/95 |
| 3,372,949 | A | * | 3/1968 | McLay .......................... 285/364 |
| 3,508,766 | A | | 4/1970 | Kessler et al. |
| 3,567,257 | A | | 3/1971 | Nowosadko |
| 4,095,825 | A | | 6/1978 | Butler |
| 4,146,261 | A | * | 3/1979 | Edmaier et al. ................ 285/364 |
| 4,573,714 | A | * | 3/1986 | Sweeney ......................... 285/363 |
| 4,688,831 | A | * | 8/1987 | Viehmann ................... 285/124.4 |
| 2,999,700 | A | | 9/1991 | Smith |
| 5,480,196 | A | * | 1/1996 | Adams, Jr. ..................... 285/369 |
| 5,944,319 | A | * | 8/1999 | Kohlman ....................... 277/314 |
| 6,106,030 | A | | 8/2000 | Nader et al. |
| 6,179,349 | B1 | * | 1/2001 | Guzzoni ........................ 285/370 |
| 6,926,283 | B2 | * | 8/2005 | Janoff et al. .................. 277/603 |
| 7,004,513 | B2 | * | 2/2006 | Knoblauch .................... 285/370 |
| 7,452,004 | B2 | | 11/2008 | Hayakawa |
| 7,481,464 | B2 | * | 1/2009 | Fusser ........................... 285/305 |
| 8,052,174 | B2 | * | 11/2011 | Sharma ....................... 285/124.1 |
| 2001/0033080 | A1 | * | 10/2001 | Dukes et al. ................... 285/370 |
| 2005/0006900 | A1 | * | 1/2005 | Lewis ............................ 285/370 |
| 2006/0145479 | A1 | * | 7/2006 | McIntyre ....................... 285/370 |
| 2007/0284879 | A1 | * | 12/2007 | Fusser ........................... 285/370 |

* cited by examiner

*Primary Examiner* — Aaron Dunwoody
(74) *Attorney, Agent, or Firm* — George L Williamson

(57) ABSTRACT

Method and apparatus for a sleeve for hose couplings which has an arched wall section which tapers toward its opposing ends so that the sleeve will fit snugly against the hose coupling. Furthermore, the sleeve has peripheral slots for containing a pair of O-rings to help seal the sleeve to each of the hose couplings. Additionally, the sleeve is contoured to match the shape of the inner wall of the hose coupling so that the sleeve forms a seal against an internal gasket contained in each of the hose coupling.

9 Claims, 3 Drawing Sheets

METHOD AND APPARATUS FOR SLEEVE FOR HOSE COUPLING

BACKGROUND OF THE INVENTION

1. Field of the Invention

The present invention relates generally to hoses and fittings and, more particularly, is concerned with a sleeve for a hose coupling.

2. Description of the Related Art

Devices related to the present invention have been described in the related art, however, none of the related art devices disclose the unique features of the present invention. In U.S. Pat. No. 6,106,030 dated Aug. 22, 2008, Nader, et al. disclosed a tubular coupling. In U.S. Pat. No. 2,999,700 dated Sep. 12, 1991, Smith disclosed a coupling for a flared end including inner and outer sleeve elements. In U.S. Pat. No. 3,567,257 dated Mar. 2, 1971, Nowosadko disclosed a tapered pipe joint. In U.S. Pat. No. 4,095,825 dated Jun. 20, 1978, Butler disclosed a taper type joint. In U.S. Pat. No. 7,452,004 dated Nov. 18, 2008, Hayakawa disclosed a pipe connecting structure. In U.S. Pat. No. 3,508,766 dated Apr. 28, 1970, Kessler, et al., disclosed a welded joint for pipe having internal coating.

While these devices may be suitable for the purposes for which they were designed, they would not be as suitable for the purposes of the present invention as hereinafter described.

SUMMARY OF THE PRESENT INVENTION

The present invention discloses a sleeve for use with conventional hose couplings which sleeve has a convex outer wall section which tapers toward its opposing ends so that the sleeve will fit snugly against the inner surface of the wall of the hose coupling so as to improve the sealing capability of the sleeve and hose coupling. Furthermore, the present invention has peripheral slots for containing a pair of O-rings to assist in sealing the sleeve to each of the hose couplings. Additionally, the sleeve of the present invention is contoured to match the shape of the inner wall of the hose coupling so that the sleeve forms a seal against an internal gasket contained in each of the hose coupling.

An object of the present invention is to provide a sleeve for joining hose couplings together. Furthermore, an object of the present invention is to provide a sleeve which forms an improved seal with the hose couplings. A further object of the present invention is to form a 100% engagement between the sleeve and the flap of the internal gasket contained in the coupling. A further object of the present invention is to provide an O-ring on the sleeve so as to provide additional sealing capability with the hose couplings. A further object of the present invention is to provide a sleeve which can be retrofit onto preexisting hose couplings. A further object of the present invention is to provide a sleeve which can be easily used by an operator. A further object of the present invention is to provide a sleeve which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
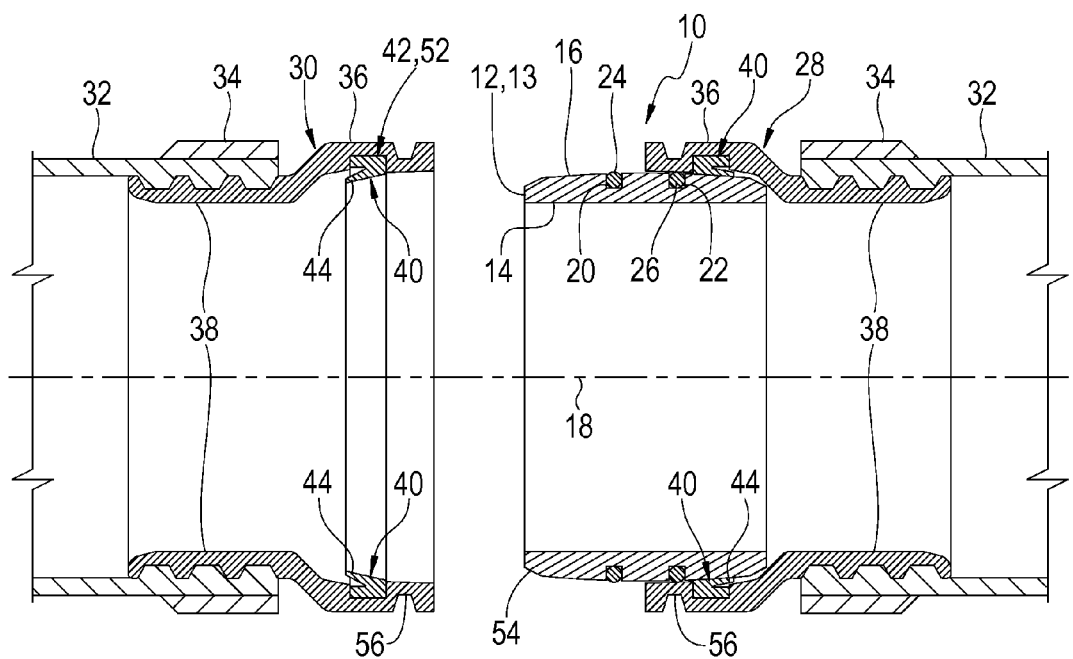
FIG. 1 is a cross section view of the present invention.

With regard to reference numerals used, the following numbering is used throughout the drawings.

10 present invention
12 sleeve
13 wall
14 inner wall
16 outer wall
18 central axis
20 slot
22 slot
24 O-ring
26 O-ring
28 coupling
30 coupling
32 hose
34 collar
36 bell portion
38 unenlarged end of coupling
40 internal gasket
42 base of internal gasket
44 inner flap
48 sleeve (prior art)
50 outer wall
52 slot
54 tapered end of sleeve
55 clamp
56 slot for clamp
58 fastener

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 illustrate the present invention wherein a sleeve for a hose coupling is disclosed and which is generally indicated by reference number 10.

Turning to FIG. 1, therein is shown the present invention generally at 10 showing a section of the wall 13 of a sleeve 12 wherein the inner surface 14 of the wall is straight or flat or planar, and, the outer wall 16 is convex with respect to the central axis 18 of the sleeve along with a first slot 20 and second slot 22 for containing an approximate ¼ inch diameter first 24 and a second 26 O-ring. Peripheral slots 20, 22 extend entirely around the circumference of the sleeve 12 along outer wall 16; also, the apex of the convex outer wall 16 is approximately intermediate the slots 20, 22 and the first and second ends of the sleeve. The sleeve 12 of the present invention 10 is expected to be used primarily with conventional hose couplings 28, 30 and may be used with new or retrofit for use with preexisting couplings. The sleeve 12 is shown inserted coaxially within a first coupling 28 proximate to a second coupling 30 wherein each coupling has a hose 32 along with a collar 34 for attaching the hose to each coupling 28 and 30 on the unenlarged end 38 of each coupling so that the sleeve and couplings are coaxially aligned in the conventional manner. Each coupling 28, 30 has an enlarged or bell portion shown at 36 on its end which has a larger diameter than the unenlarged portion of the coupling shown at 38. The outside diameter of the sleeve 12 is slightly less than the inside diameter of the bell portion 36 of the couplings 28, 30 so that the similar diameters along with the convex shape of the sleeve causes the sleeve to be contoured to substantially match the shape of the inner wall, which is somewhat concave shaped, of the bell portion of the couplings in order to form an improved seal between the sleeve and coupling and the internal gasket 40. Also shown is an internal gasket 40 in each bell portion of coupling 28, 30 having a base portion 42 disposed in slot 52 and an inwardly extending flap portion 44 on the internal gasket wherein the flap 44 seals against the outer wall surface 16 of the sleeve 12. It can be seen that the inner flap 44 seals against the outer wall 16 of sleeve 12 along 100% of the length of the inner flap 44 of internal gasket 42 so as to prevent fluid from flowing between the internal flap 44 and the outer wall surface 16 of sleeve 12. Sleeve 12 also has a tapered/beveled shoulder 54 on each of its ends.

Figure 2:
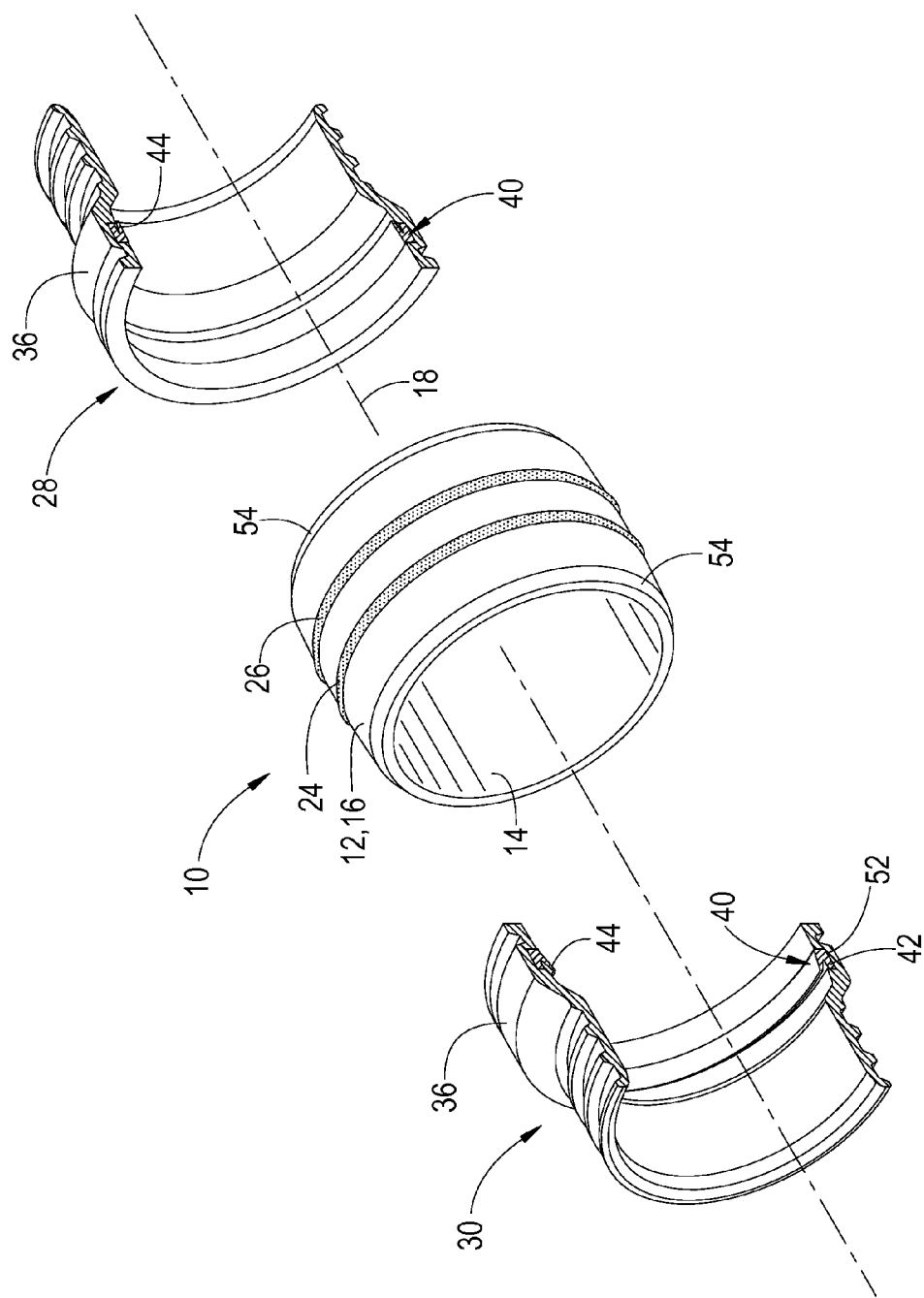
FIG. 2 is a perspective view of the present invention

Turning to FIG. 2, therein is shown the present invention generally at 10 showing the substantially cylindrical sleeve 12 wherein the inner surface 14 of the wall is straight or flat and the outer wall 16 is convex with respect to the central axis 18 of the sleeve along an approximate ¼ inch diameter first 24 and a second 26 O-ring. The sleeve 12 is shown in an exploded view between a first coupling 28 and a mating coupling 30. Each coupling 28, 30 has an enlarged or bell portion shown at 36 on its end which has a larger diameter than the unenlarged portion of the coupling shown at 38 for receiving the sleeve 12 therein. Also shown is an internal gasket 40 in each bell portion 36 of coupling 28, 30 having a base portion 42 disposed in slot 52 and an inwardly extending flap portion 44 on the internal gasket wherein the flap 44 seals against the outer wall surface 16 of the sleeve 12. Sleeve 12 also has a tapered shoulder 54 on each of its ends. Hose 32 and collar 34 are also shown.

Figure 3:
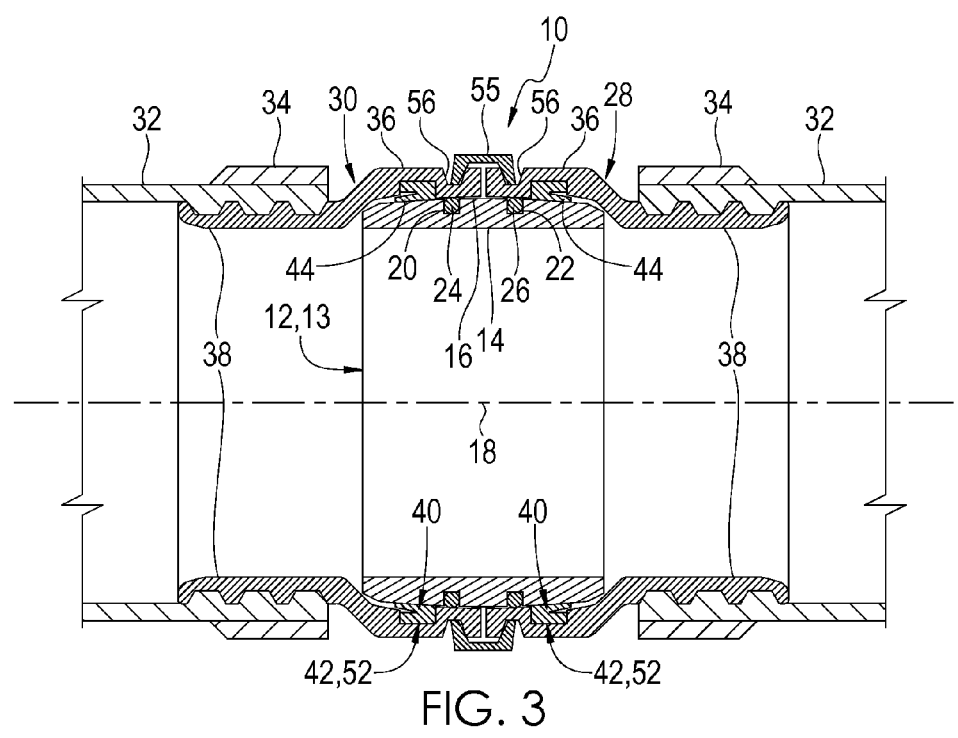
FIG. 3 is a cross section view of the present invention shown in operative connection.

Turning to FIG. 3, therein is shown the present invention generally at 10 showing a section of the wall 13 of a sleeve 12 wherein the inner surface 14 of the wall is straight or flat and the outer wall 16 is convex with respect to the central axis 18 of the sleeve along with a first slot 20 and second slot 22 for containing an approximate ¼ inch diameter first 24 and a second 26 O-ring. The sleeve 12 of the present invention 10 is expected to be used primarily with conventional hose couplings 28, 30 and may be used with new or retrofit for use with preexisting couplings. The sleeve 12 is shown inserted in a first coupling 28 and a mating second coupling 30 wherein each coupling has a hose 32 (shown in phantom) along with a collar 34 (shown in phantom) for attaching the hose to each coupling 28 and 30 on the unenlarged end 38 of each coupling. Each coupling 28, 30 has an enlarged or bell portion shown at 36 on its end which has a larger diameter than the unenlarged portion of the coupling shown at 38. It can be seen that the inner diameter of the sleeve 12 is approximately equal to the inner diameter of the unenlarged end of coupling 28, 30 and that o-ring 24 seals against coupling 30 and o-ring 26 seals against coupling 28. Also shown is an internal gasket 40 in each bell portion of coupling 28, 30 having a base portion 42 disposed in slot 52 and an inwardly extending flap portion 44 on the internal gasket wherein substantially the entire length of the surface of the flap 44 seals against the outer wall surface 16 of the sleeve 12 as the flap runs longitudinally a short distance along the couplings 28, 30. It can be seen that the inner flap 44 seals against the outer wall 16 of sleeve 12 along 100% of the length of the inner flap 44 of internal gasket 42 so as to prevent fluid from flowing between the internal flap 44 and the outer wall surface 16 of sleeve 12. Sleeve 12 also has a tapered shoulder 54 on each of its ends. Also shown is a conventional clamp 55 in mating slots 56 for securing coupling 28, 30 together as would be done in the standard manner by one skilled in the art.

Figure 4:
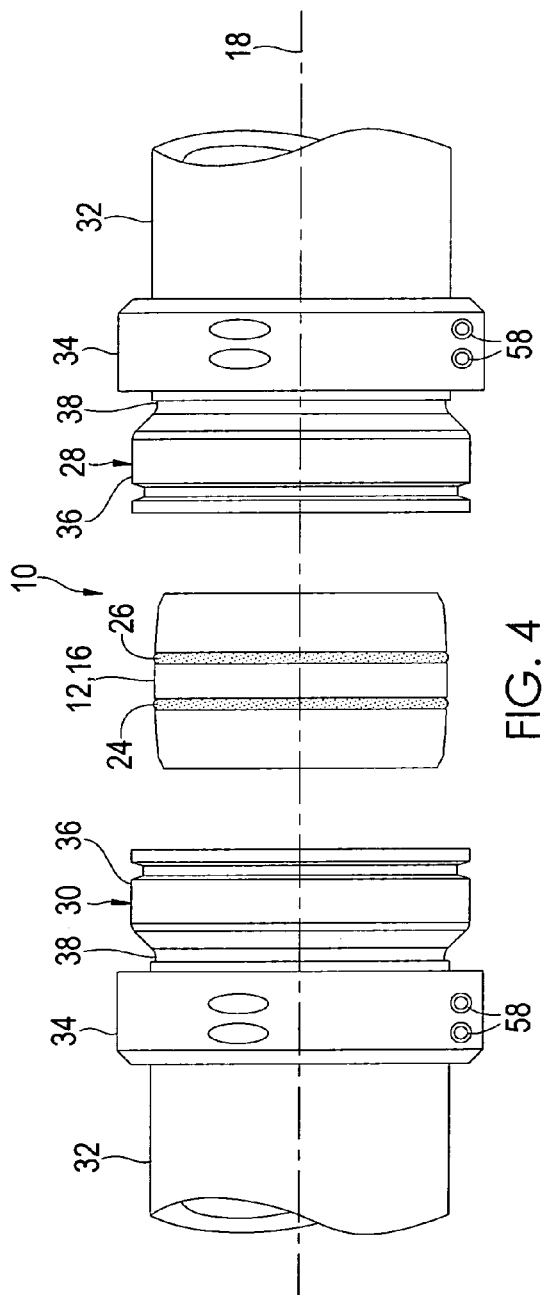
FIG. 4 is a side elevation view of the present invention.

Turning to FIG. 4, therein is shown the present invention generally at 10 showing a sleeve 12 wherein the outer wall 16 is convex with respect to the central axis 18 of the sleeve along with an approximate ¼ inch diameter first 24 and a second 26 O-ring. The sleeve 12 is shown disposed between a first coupling 28 proximate to a second coupling 30 wherein each coupling has a hose 32 along with a collar 34, having multiple collar fasteners 58 thereon, for attaching the hose to each coupling 28 and 30 on the unenlarged end 38 of each coupling as would be done in the standard manner by one skilled in the art. Each coupling 28, 30 has an enlarged or bell portion shown at 36 on its end which has a larger diameter than the unenlarged portion of the coupling shown at 38. Sleeve 12 also has a tapered shoulder 54 on each of its ends.

Figure 5:
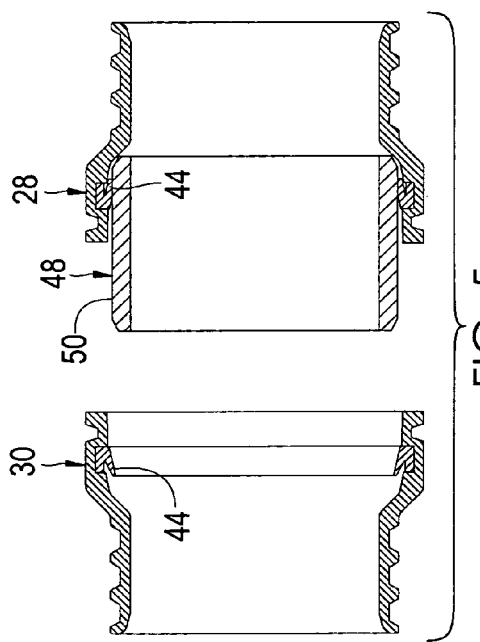
FIG. 5 is a cross sectional view of the prior art.

Turning to FIG. 5, therein is shown the prior art sleeve 48 wherein the outer wall 50 is shown as being flat and wherein the inner flap 44 is shown having only about 50% of the longitudinal length of the inwardly extending flap 44 in contact with the outer surface 50 of the outer wall of the prior art sleeve 48. It should be clear that there is a greater chance of leakage between the prior sleeve 48 and any internal fluid contained in the coupling as opposed to the sleeve 12 of the present invention 10. Other features of the coupling are similar to the couplings previously described which is why the sleeve 12 of the present invention can be retrofit for use with preexisting couplings.

By way of reference to FIGS. 1-5, additional explanation of the present invention 10 is provided. The present invention 10 is expected to be used on hose couplings 28, 30 for a variety of markets, e.g., for agriculture, energy and other markets. One of the markets is related to hydraulic fracking of oil/gas wells. Due to energy costs this method of drilling has seen significant increases recently. In an effort to improve efficiencies the well drillers have started changing from rigid pipe to lay-flat, flexible hose 32 for water supply during the drilling process. The types of conventional hose couplings 28, 30 used in this process are intended for pressure applications only, however, during a well frack they can experience from low pressure to vacuum conditions in the hose 32 and conventional prior art couplings are not designed for these conditions and thus can leak in these conditions. The present invention 10 discloses a sleeve 12 for use with this type of condition which eliminates the low pressure/vacuum leakage issue. The present invention 10 is expected to be used with couplings 28, 30 having diameters ranging from 3-16 inches.

The materials of construction of the present invention 10 follow: the sleeve 12 is expected to be constructed of any suitable material and may, by way of example, include steel, aluminum, fiberglass, brass or various plastics; the O-ring 24, 26 may be made of any suitable material and may, by way of example, include rubber, buna, viton, polyurethane, neoprene, silicone, EPDM or other similar elastomeric material.

I claim:

1. A sleeve for sealing the ends of first and second hose couplings, the hose couplings for conveying fluid, comprising:
    a) a first and second coupling, each said coupling having a first enlarged end and a second unenlarged end, a hose being attached coaxially to each said unenlarged end of said coupling, wherein said first and second couplings are adapted for having said enlarged end be connected to each other;
    b) an internal circumferential slot disposed proximate said enlarged end of each said first and second coupling, a gasket disposed in each said first and second slot, an inner flap portion disposed on said gasket, said inner flap portion having a surface extending longitudinally along said coupling a short distance;
    c) a cylindrically shaped sleeve, said sleeve coaxially disposed in said enlarged ends of said couplings, said sleeve having a convex shaped outer wall, wherein substantially said entire surface of said inner flap portion of each said gasket contacts said outer wall of said sleeve for providing a first seal on said coupling so as to prevent leakage of fluid from said couplings when said couplings are connected to each other;
    d) a first and second external circumferential slot disposed on said outer surface of said sleeve, wherein said external slots are parallel to each other and spaced apart, an O-ring disposed in each said external slot; and
    e) wherein one said O-ring contacts said enlarged end of one said coupling so as to provide a second seal on said coupling so as to prevent leakage of fluid from said coupling when said couplings are connected to each other.

2. The sleeve of claim 1, wherein said outer surface of said sleeve substantially conforms to an inner surface of each said coupling when said couplings are connected to each other.

3. The sleeve of claim 1, wherein said inner flap portion of said gaskets and said O-rings substantially prevent leakage of fluid from said couplings when said couplings are connected to each other.

4. A method of making a sleeve for sealing the ends of first and second hose couplings, the hose couplings for conveying fluid, comprising the steps:
    a) providing first and second couplings, each coupling having a first enlarged end and a second unenlarged end, a hose being attached coaxially to each unenlarged end of the coupling, wherein the first and second couplings are adapted for connecting the enlarged ends to each other;
    b) providing an internal circumferential slot proximate the enlarged end of each first and second coupling, a gasket disposed in each first and second slot and having an inner flap portion disposed thereon, the inner flap portion having a surface extending longitudinally along the coupling a short distance;
    c) providing a cylindrically shaped sleeve being coaxially disposed in the enlarged ends of the couplings, the sleeve having a convex shaped outer wall, wherein substantially the entire surface of the inner flap portion of each gasket contacts the outer wall of the sleeve for providing a first seal on the couplings so as to prevent leakage of fluid from said couplings when the couplings are connected to each;
    d) providing first and second external circumferential slots on the outer surface of the sleeve so that the external slots are parallel to each other and spaced apart, providing an O-ring in each external slot; and
    e) wherein one O-ring contacts the enlarged end of one coupling so as to provide a second seal on the coupling so as to prevent leakage of fluid from the coupling when the couplings are connected to each other.

5. The method of claim 4, wherein the outer surface of the sleeve is shaped to substantially conform to the shape of an inner surface of each coupling when the couplings are connected to each other.

6. The method of claim 4, wherein the inner flap portion of the gaskets and the O-rings substantially prevent leakage of fluid from the couplings when the couplings are connected to each other.

7. A construction for sealing the ends of first and second hose couplings, the hose couplings for conveying fluid, each coupling having a first enlarged end and a second unenlarged end, a hose being attached coaxially to each unenlarged end of the couplings, the first and second couplings being adapted for having the enlarged end be connected to each other, an internal circumferential slot disposed proximate the enlarged end of each first and second coupling, a gasket disposed in each first and second slot, an inner flap portion disposed on the gasket, the inner flap portion having a surface extending longitudinally along the coupling a short distance, comprising:
    a) a cylindrically shaped sleeve, said sleeve coaxially disposed in said enlarged ends of said couplings, said sleeve having a convex shaped outer wall, wherein substantially said entire surface of said inner flap portion of each said gasket contacts said outer wall of said sleeve for providing a first seal on said coupling so as to prevent leakage of fluid from said couplings when said couplings are connected to each other;
    b) a first and second external circumferential slot disposed on said outer surface of said sleeve, wherein said external slots are parallel to each other and spaced apart, an O-ring disposed in each said external slot; and
    c) wherein one said O-ring contacts said enlarged end of one said coupling so as to provide a second seal on said coupling so as to prevent leakage of fluid from said coupling when said couplings are connected to each other.

8. The construction of claim 7, wherein said outer surface of said sleeve substantially conforms to an inner surface of each said coupling when said couplings are connected to each other.

9. The construction of claim 7, wherein said inner flap portion of said gaskets and said O-rings substantially prevent leakage of fluid from said couplings when said couplings are connected to each other.

* * * * *